US007880637B2

(12) United States Patent
Weiss

(10) Patent No.: US 7,880,637 B2
(45) Date of Patent: Feb. 1, 2011

(54) LOW-PROFILE SIGNAL DEVICE AND METHOD FOR PROVIDING COLOR-CODED SIGNALS

(75) Inventor: Mitchell Weiss, Carlisle, MA (US)

(73) Assignee: Seegrid Corporation, Pittsburgh, PA (US)

( * ) Notice: Subject to any disclaimer, the term of this patent is extended or adjusted under 35 U.S.C. 154(b) by 614 days.

(21) Appl. No.: 11/760,859

(22) Filed: Jun. 11, 2007

(65) Prior Publication Data

US 2008/0303659 A1 Dec. 11, 2008

(51) Int. Cl.

| | |
|---|---|
| ***G08B 3/00*** | (2006.01) |
| ***G08B 5/22*** | (2006.01) |
| ***B60Q 11/00*** | (2006.01) |
| ***B60Q 1/26*** | (2006.01) |
| ***F21V 1/00*** | (2006.01) |
| ***F21V 21/00*** | (2006.01) |

(52) U.S. Cl. ............................. 340/815.45; 340/384.1; 340/458; 340/460; 340/691.1; 340/692; 362/227; 362/236; 362/240; 362/249.02

(58) Field of Classification Search ............. 340/384.1, 340/691.1, 692, 815.45, 908.1, 458–463; 362/227, 236, 249.02

See application file for complete search history.

(56) References Cited

U.S. PATENT DOCUMENTS

| | | | | |
|---|---|---|---|---|
| 5,806,965 | A * | 9/1998 | Deese | 362/249.04 |
| 5,929,788 | A * | 7/1999 | Vukosic | 340/908.1 |
| 6,340,868 | B1 * | 1/2002 | Lys et al. | 315/185 S |
| 6,626,557 | B1 * | 9/2003 | Taylor | 362/235 |
| 6,677,856 | B2 * | 1/2004 | Perlman et al. | 340/468 |
| 7,135,960 | B2 * | 11/2006 | Arcaria et al. | 340/384.1 |
| 7,161,311 | B2 * | 1/2007 | Mueller et al. | 315/294 |
| 7,281,817 | B2 * | 10/2007 | Hsieh et al. | 362/235 |
| 7,497,593 | B2 * | 3/2009 | Wang | 362/249.02 |
| 2003/0030567 | A1 | 2/2003 | Hetzel et al. | |

FOREIGN PATENT DOCUMENTS

| | | |
|---|---|---|
| KR | 1020030064712 A | 2/2003 |
| KR | 20-0364841 | 10/2004 |
| KR | 1020050070491 A | 7/2005 |
| KR | 1020060090095 A | 8/2006 |

OTHER PUBLICATIONS

Brochure “Signal50 Warning Tower Lights”, Publication No. WTL-CAT, Mar. 2002 (9 pp).

Allen-Bradley “Control Tower Stack Lights”, www.ab.com/en/epub/catalogs/12768/229240/229246/2531107/5190148, Sep. 28, 2006. (2 pp).

(Continued)

*Primary Examiner*—Benjamin C Lee
*Assistant Examiner*—Lam P Pham
(74) *Attorney, Agent, or Firm*—Mills & Onello, LLP; David M. Mello

(57) ABSTRACT

A low-profile signal device is provided having a plurality of light emitters disposed on at least one support member, the plurality of light emitters configured to emit light in a plurality of colors that indicate one or more predefined conditions; a housing substantially enclosing the at least one support member; a signal interface coupled to the plurality of light emitters and configured to selectively activate light emitters from the plurality of light emitters in response to a received control signal.

32 Claims, 4 Drawing Sheets

OTHER PUBLICATIONS

Patlite Signal Towers and Visual Lighting Products, www.netmotion.com/htm_files/ot_patlite.htm, Sep. 28, 2006 (2 pp).
Patlite Visual Lighting Products, LCE-U Series Wiring Diagrams, www.patlite.com/visible/lce-u-wired.htm, Sep. 28, 2006 (3 pp).
Patlite Visual Lighting Products, LED Type Light, www.patlite.com/visible/nhm.htm, Sep. 28, 2006 (2 pp.).
Patlite Visual Lighting Products, NHM-3FB Mechanical Diagrams, www.patlite.com/visible/nhm-mech.htm, Sep. 28, 2006 (1 pg.).

International Search Report issued in on Jun. 11, 2008, in corresponding PCT Application No. PCT/US2008/066473.

* cited by examiner

LOW-PROFILE SIGNAL DEVICE AND METHOD FOR PROVIDING COLOR-CODED SIGNALS

FIELD OF INTEREST

The present inventive concepts relate to signal devices and methods that provide color-coded signals.

BACKGROUND

Visual signal devices are widely used in industrial applications, such as warehouses, loading docks, manufacturing facilities, or other settings where a machine status indicator, safety indicator, or alarm indicator is provided in the form of color-coded signals. For example, signal tower lights, also referred to as stack lights, can be placed on a forklift, tugger, pallet jack, order picker or other manned vehicle or equipment to provide a status indication in the form of a color-coded signal. Such color coded signals can be useful to those operating or in proximity to such equipment for providing safety and status indications. In addition to manned mobile equipment, such signal towers can also be used on stationary equipment, for the same status and safety purposes.

Typical signal tower lights include a group of color emitting modules stacked one on top of the other. Each module emits a single color. Each module comprises a colored lens, permitting a corresponding color to be emitted when the module is activated (or turned "on"). The combination of colors in a signal tower light are chosen based on a user's needs, and the signals to be communicated, wherein the colors of the modules are chosen to indicate the existence of possible predefined conditions.

For example, as illustrated in FIG. 1, a five-level signal tower light 100 comprises five modules 110-150, each module having a colored lens for emitting a single color based on the color of the lens. As an example, module 110 can include a red lens, module 120 can include a yellow lens, module 130 can include a green lens, etc. In this manner, each color or combination of individual colors can be associated with a predefined condition. For example, the red module 110, when turned on, can indicate a warning or alarm as a first predefined condition, i.e., "stop." The yellow module 120, when turned on, can indicate "caution" as a second predefined condition, as another example. The colors are typically chosen as a function of the equipment or environment, or both. The conventional signal tower light, therefore, is a relatively tall and narrow stack of colored lights, such as the signal tower 100 illustrated in FIG. 1. The more modules that are added to the stack, the taller the signal tower light.

Signal towers, such as that of FIG. 1, can be mounted to stationary or mobile equipment. To do so, signal tower 100 is often mounted on a pole 160 and a base 170 arrangement to improve visibility. In such instances, the increased height of the signal tower light is an acceptable trade-off relative to any increased vulnerability to the light, or other property, created by such additional height. That is, even if not ideal, in order to achieve the correct number of lights for the relevant conditions being monitored or for desired visibility, a certain amount of height could be unavoidable. In particular, when mounted to mobile equipment, there is the challenge of mounting the lights high enough that they are clearly visible and low enough that they can fit through doorways. Also, while FIG. 1 shows a five level stack light, on mobile equipment it is also common to mount a single light on a pole. Nevertheless, even when there is only a single light, the height issues remain.

SUMMARY OF INVENTION

In accordance with a first aspect of the invention, there is provided a low-profile signal device comprising a plurality of light emitters disposed on at least one support member, a housing substantially enclosing the at least one support member, and a signal interface coupled to the plurality of light emitters. The plurality of light emitters is configured to emit light in a plurality of colors that indicate one or more predefined conditions. The signal interface is configured to selectively activate light emitters from the plurality of light emitters in response to a received control signal.

The width of the housing can be greater than a height of the housing.

The height of the housing can be not more than about 1 inch.

The support member can be a circuit board having circuit paths formed therein connecting the plurality of light emitters to the signal interface.

The at least one support member can be a plurality of support members.

The signal device can comprise a first group of light emitters coupled to a top side of the support member and a second group of light emitters coupled to a bottom side of the support member.

The first group of emitters can be configured to provide a first set of colors and the second group of emitters is configured to provide a second set of color, different from the first set of colors.

The signal device can comprise a controller coupled to the signal interface and configured to generate the control signal in response to at least one stimuli indicating the existence of a condition from the one or more predefined conditions.

The housing can comprise an outer member surrounding a periphery of the support member, and can further comprise at least one of a top member disposed over a top side of the support member and peripherally coupled to a top portion of the outer member, and a bottom member disposed below a bottom side of the support member and peripherally coupled to a bottom portion of the outer member.

The housing can form a waterproof or water resistant enclosure around the support member and the plurality of light emitters.

The plurality of light emitters can comprise light emitting diodes (LEDs).

The LEDs can include single color light emitting diodes or multi-color light emitting diodes.

The signal device can comprise an audio alarm configured to generate a sound from a set of predefined sounds, each sound indicating one of the predefined conditions.

The signal device can comprise a coupling for mounting the device to a piece of mobile equipment.

The signal device can comprise a second plurality of light emitters disposed on a second at least one support member, the second plurality of light emitters can be configured to emit light in a second plurality of colors, a second housing substantially enclosing the second at least one support member and configured to couple to the first housing, and a second signal interface can be coupled to the second plurality of light emitters and configured to selectively activate light emitters from the second plurality of light emitters in response to the received control signal.

In accordance with another aspect of the invention, a low-profile signal device comprises a plurality of light emitting diodes (LEDs) disposed on at least one circuit board, a housing substantially enclosing the at least one circuit board, and a signal interface coupled to the plurality of LEDs. The plurality of LEDs are configured to emit light in a plurality of colors that indicate one or more predefined conditions. The signal interface is configured to selectively activate LEDs from the plurality of light emitters in response to a received control signal.

The LEDs can include single color light emitting diodes. The LEDs can include multi-color diodes.

A width of the housing can be greater than a height of the housing.

The height is not more than about 1 inch.

The device can include a coupling configured to mount the device to a surface.

In accordance with another aspect of the invention, there is provided a method of indicating the existence of one or more predefined conditions. The method comprises configuring a signal device with a plurality of light emitters to emit light in a plurality of colors. The method further comprises defining a set of predefined conditions and translating the set of predefined conditions into a corresponding set of control signals. The method further comprises in response to the existence of a predefined condition from the set of predefined conditions, generating a corresponding control signal from the set of control signals. The method further comprises generating a light signal representing the predetermined condition by applying the control signal to at least some light emitters from the plurality of light emitters.

The light emitters can include light emitting diodes (LEDs).

The LEDs include single color LEDs. The LEDs can include multi-color LEDs.

The method further comprises substantially enclosing the plurality of light emitters in a housing, wherein a width of the housing is greater than a height of the housing.

The height of the housing can be not more than about 1 inch.

In accordance with another aspect of the invention, there is provided method of making a low-profile signal device. The method comprises coupling a plurality of light emitters to at least one support member, the plurality of light emitters configured to emit light in a plurality of colors that indicate one or more predefined conditions. The method further comprises substantially enclosing the at least one support member with a housing. The method further comprises coupling a signal interface to the plurality of light emitters, the signal interface configured to selectively activate light emitters from the plurality of light emitters in response to a received control signal.

The light emitters can include light emitting diodes (LEDs).

The LEDs can include single color LEDs. The LEDs can include multi-color LEDs.

A width of the housing can be greater than a height of the housing.

The height of the housing can be not more than about 1 inch.

BRIEF DESCRIPTION OF THE DRAWINGS

The below indicated figures illustrate exemplary embodiments relative to aspects of the present invention. The figures are provided by way of example, not by way of limitation. In the figures, like reference numerals refer to the same or similar elements. The drawings are not necessarily to scale, unless so noted.

DETAILED DESCRIPTION OF PREFERRED EMBODIMENTS

It will be understood that, although the terms first, second, etc. can be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises,""comprising," "includes" and/or "including," when used herein, specify the presence of stated features, steps, operations, elements, and/or components, but do not preclude the presence or addition of one or more other features, steps, operations, elements, components, and/or groups thereof.

Figure 2A:
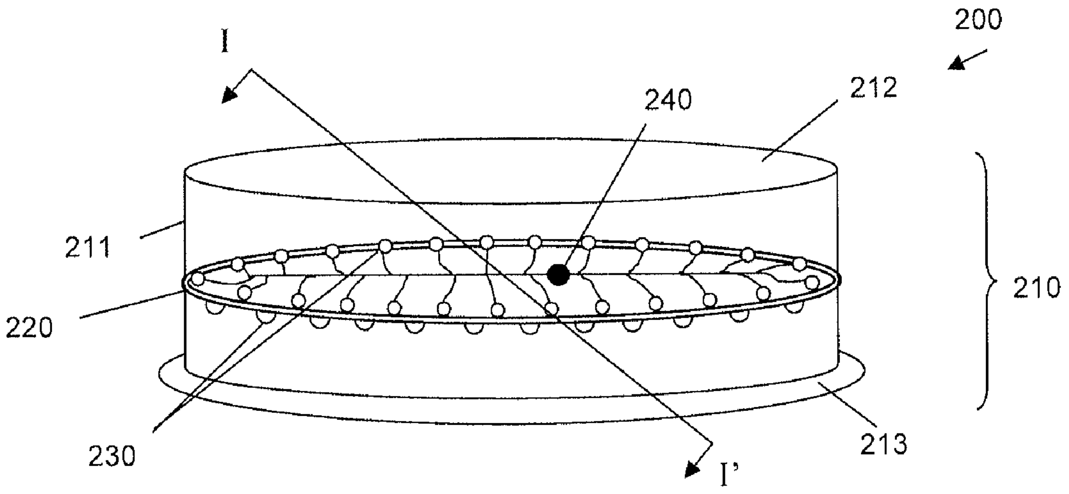
FIG. 2A is an illustrative perspective view of an embodiment of a low-profile signal device, according to aspects of the present invention.
Figure 2B:
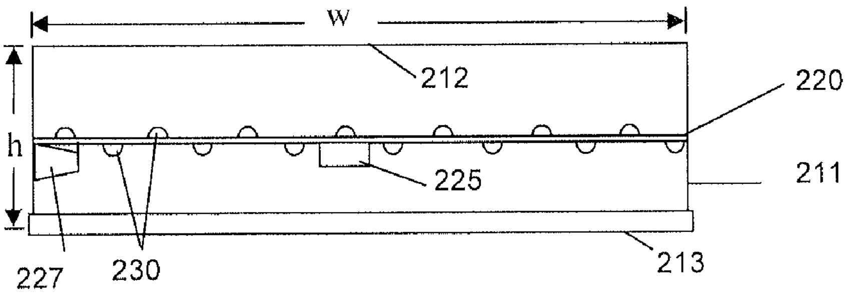
FIG. 2B is a cross-sectional view of the low-profile signal device of FIG. 2A, taken along lines I-I' of FIG. 2A.

FIG. 2A is an illustrative perspective view of an embodiment of a low-profile signal device. FIG. 2B is a cross-sectional view of the low-profile signal device 200 of FIG. 2A, taken along lines I-I' of FIG. 2A.

In the embodiment of FIGS. 2A and 2B, the low-profile signal device 200 comprises a housing 210 configured to support a support member 220 on which a set of light emitters 230 are mounted. In this embodiment the light emitters 230 are light emitting diodes (LEDs) and the support member 220 is a circuit board. Housing 210 supports and maintains the circuit board 220 with LEDs 230 mounted thereon. The LEDs can be single color LEDs or multi-color LEDs, i.e., LEDs capable of emitting more than one color. The circuit board 220 can be a single layer or multi-layer circuit board.

Figure 1:
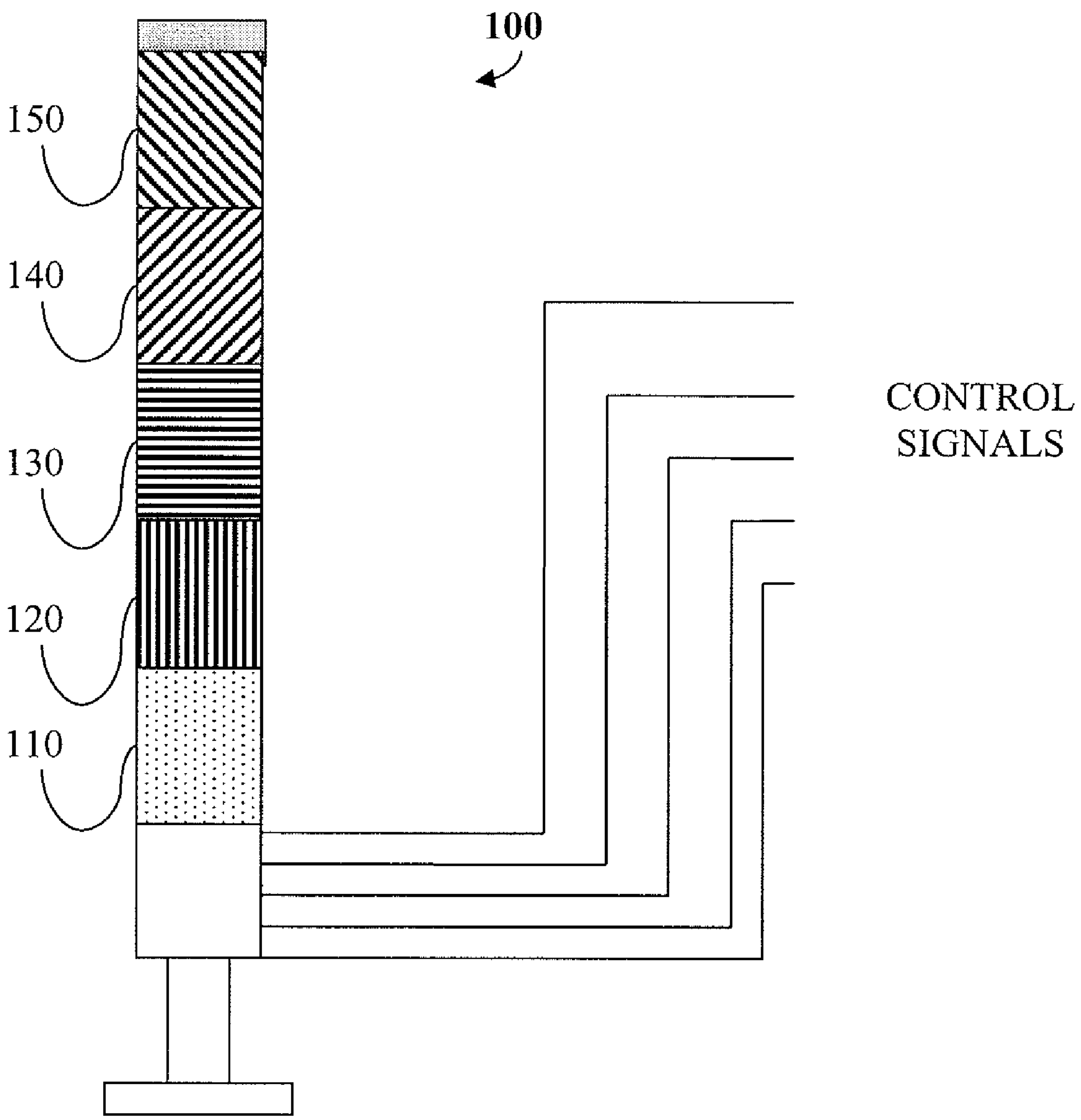
FIG. 1 (PRIOR ART)
FIG. 1 is an illustrative view of a conventional signal tower light.

In the illustrative embodiment, a width w of the low-profile signal device 200 is greater than its height h. In other embodiments, the width w can be reduced to be closer to the height h. In the embodiment of FIGS. 2A and 2B, h is less than about 1 inch and w is up to about 7 inches, and the light emitters 230 are configured to collectively emit up to about 8 colors. But h and w are not limited to such dimensions in other embodiments, and more than 8 colors is possible. In any of the various possible configurations, a low-profile signal device in accordance with this disclosure provides multiple light colors in a single housing (or stage)—unlike conventional signal tower lights. This is significant departure from conventional signal tower lights, as demonstrated by signal tower 100 of FIG. 1.

In this embodiment, the height of low-profile signal device 200 is less than the height of one stage of a conventional signal tower light, while being capable of emitting more than one color. As a result, a low-profile signal device in accordance with this disclosure can indicate a greater number of predefined conductions by providing a greater number of light signals with significantly less height. As an additional result, low-profile signal device 200 is significantly less vulnerable to being damaged and, particularly in the case of mobile equipment, is less likely to cause damage. For example, the low-profile signal device 200 is particularly useful in many industrial applications, for example, in warehouses, loading docks, and manufacturing facilities, where the low-profile signal device can be mounted on a tugger, pallet jack, or order picker, as examples, or other mobile equipment, and where an observer can visually identify a color that is emitted from the light emitters 230 indicating a specific condition.

Housing 210 can take any of a variety of forms. However, in any of its forms, housing 210 allows light from LEDs 230 to be externally viewable. In FIGS. 2A and 2B housing 210 is substantially disk shaped, having an outer member 211, a top member 212 and a bottom member 213. In this embodiment, outer member 211 includes a clear, tinted, colored, translucent, semi-transparent, or transparent wall, or any combination thereof, that permits light to pass through, for example, for external determination of the color signals being produced by the LEDs 230. Here the outer member 211 is preferably composed of one or more rigid materials that permit the passage of light, for example, one or more of plastic, fiberglass, glass, or the like. In other embodiments, outer member 211 can define openings through which the light from LEDs 230 is emitted. In that case, the remaining portions of outer member 211 need not be configured to transmit light.

In the illustrative embodiment, top member 212 of housing 210 is comprised of a rigid material configured to couple with outer member 211. Top member 212 can thereby be configured as a cover that substantially encloses and protects circuit board 220 and LEDs 230. Top member 212 can be coupled to outer member 211 in any of a variety of manners, e.g., with screws or bolts, glue, or by a threaded interface. In other embodiments, top member 212 can be integral with outer member 211—forming a single, combined component.

In some embodiments, top member 212 (or housing 210, generally) can be configured to accept the mounting of another low-profile signal device, e.g., in a stacked arrangement. In such a case, a stacked arrangement of low-profile signal device provides significantly more signal color options and combination than the prior art signal tower lights, with significantly less height.

Bottom member 213 of housing 210 can be configured to facilitate mounting to either mobile or stationary equipment, by any of a variety of mechanisms. Such mechanism could be mounted by adhesion (e.g., glue or magnet) or fastening with screws or bolts, as a couple of examples. There is no inherent limit on the manners of mounting the low profile signal device 200.

In the illustrative embodiment, bottom member 213 is comprised of a rigid material configured to couple with outer member 211. Outer member 211 can be coupled to bottom member 213 in any of a variety of manners, e.g., with screws or bolts, glue, or by a threaded interface. In other embodiments, bottom member 213 can be integral with outer member 211—forming a single, combined component.

In the illustrative embodiment, circuit board 220 has a circular shape and is mounted within the confines of housing 210. The circuit board 220 can be a commercial-grade circuit board, such as a printed circuit board (PCB), to which the light emitters 230 are attached. As will be appreciated by those skilled in the art, circuit board 220, and low-profile signal device 200, need not be circular nor do they necessarily need to emit light in all directions. For example, the footprint of the low-profile signal device could be square, rectangular, pie shaped, semi-circular, oval, hexagonal, octagonal and so on. Light emitters 230 can be attached to one or both sides of the circuit board 220. In the illustrative embodiment, LEDs 230 are mounted peripherally to both sides of circuit board 220, i.e., a top side and a bottom side.

Figure 2C:
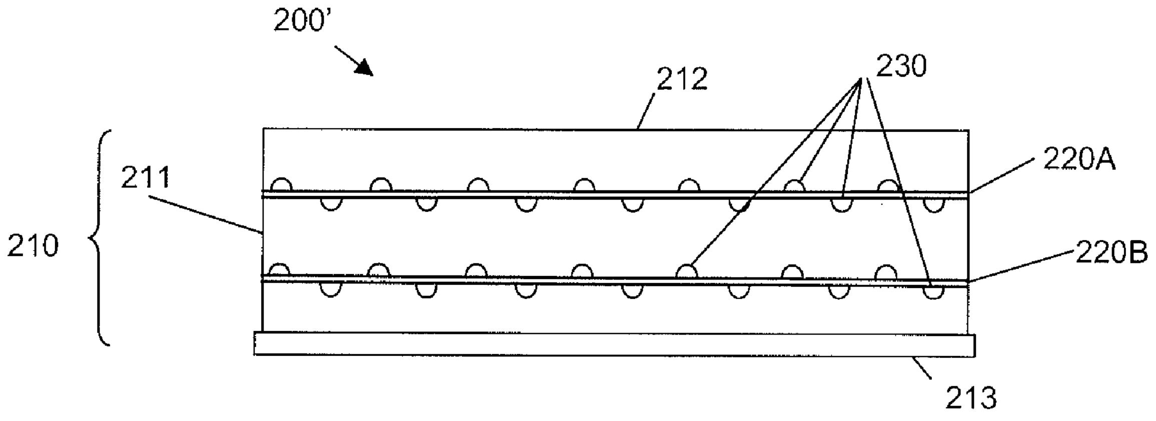
FIG. 2C is a side view of a low-profile signal device having multiple circuit boards, according to aspects of the present invention.

While FIGS. 2A and 2B show a single circuit board 200, in other embodiments, such as that in FIG. 2C, more than one circuit board having light emitters disposed thereon can be included within housing 210. FIG. 2C provides a side view of such a low-profile signal device 200', which is substantially the same as low-profile device 200 of FIGS. 2A and 2B. However, low-profile signal device 200' comprises multiple (here 2) circuit boards 220A and 220B with light emitters 230 mounted on each in an illustrative form. Thus, multiple circuit boards can be disposed with housing 210, and light emitters 230 can be attached to each side of each of the multiple circuit boards.

Returning to FIGS. 2A and 2B, in one embodiment, the edge of the circuit board 220 is attached to an inner wall of the outer member 211. In another embodiment, the circuit board in maintained within housing 210, without contacting outer member 211.

In another embodiment, the outer member 211 is formed of a plurality of pieces, and comprises a first outer member that is affixed to a peripheral edge of the bottom side of the circuit board, and a second outer member that is affixed to a peripheral edge of a top side of the circuit board 200. Thus, the first outer member and second outer member substantially sandwich the peripheral edge of circuit board 220 in such an embodiment. In such a case, top member 212 and bottom member 213 can optionally be attached to the first outer member and second outer member, respectively. In another embodiment, the first outer member and the bottom member 212 can be integral to form a single component. And the second outer member and top member 213 can be integral to form a single component. In this manner, the combination of the first outer member, second outer member, top member, and bottom member can substantially enclose the circuit board 220 and light emitters 230 positioned thereon.

In the illustrative embodiment, circuit board 220 is configured with multiple signal paths formed to provide power signals to LEDs 230. For example, all LEDs of the same color or type can be connected to a common signal path and receive the same signal simultaneously. The signal powers the corresponding LEDs to generate the emitted light. The power can come from any known form of power source, whether internal or external, to the low-profile signal device 200, e.g., a battery.

A signal interface 240 can be formed on or connected to circuit board 220. The interface 240 can include a set of wires or a standard plug or connector used in the electrical arts, which provides a mechanism for getting power and/or control signals to circuit board 220 for selectively turning on one or more of LEDs 230. In one embodiment, a controller 225 (see FIG. 2B) could be mounted on the circuit board and configured to receive signals from sensors configured to determine the existence of a predetermined condition for which LEDs should be turned on. The controller could be configured to apply power to the LEDs, from the LEDs 230, as needed to generate the light signal corresponding to the sensed predetermined condition. In another embodiment, the controller is not part of low-profile signal device 200. Rather the sensors and controller are elsewhere, e.g., integral with the equipment to which the low-profile signal device 200 is mounted. In this latter case, interface 240 can be a passive device configured to provide signals to LEDs, from the plurality of LEDs 230, via corresponding signal paths formed on circuit board 220 as they are received from the controller 225.

LEDs 230 are positioned on the circuit board 220 and proximate to the interior of outer member 211. LEDs 230 are oriented to selectively emit, through outer member 211, one or more colors or color combinations from a plurality of available colors. In this manner, when the light emitters 230 are activated (or turned on), at least one color indicating at least one predefined condition is emitted by the light emitters 230 through outer member 211. In other words, the light emitters 230 are configured to selectively emit colors, or color combinations or patterns, that indicate the existence of a predetermined condition.

As mentioned above, LEDs 230 can be single or multi-color LEDs, or there can be a combination of the foregoing. In the illustrative embodiment, LEDs 230 are mounted on a top side and on a bottom side of circuit board 220. On the top side, the LEDs 230 can include one or more groups of single color LEDs, e.g., red and green LEDs, disposed in an alternating fashion. Similarly, on the bottom side, the LEDs 230 can include one or more other groups of LEDs, e.g., yellow and blue, also disposed in alternating fashion. Or the bottom side could have the same color LEDs has is on the top side of the circuit board 220. The actual selection of LEDs, whether single color or multi-color, will depend on the signaling needs of the application and environment (e.g., tugger or pallet jack in a warehouse). There is no inherent limitation in this regard.

Additionally, patterning of light emissions from LEDs can provide another mechanism for communicating a distinct predefined condition. For example, in various embodiments, the LEDs 230 can be steady, or flashing, or a combination of both. In another embodiment, a group of LEDs can be configured to emit a color in a sequential manner, e.g., rotating manner, or an alternating manner, e.g., red-yellow-red-yellow- . . . . There is no inherent limitation in this regard.

The light emitters 230 are coupled to at least one of the top side and the bottom side of circuit board 220 and are oriented with respect to the circuit board to emit at least one color. The light emitters 230 are preferably equally positioned about the periphery of the circuit board 220, and oriented to emit light through at least the outer member 211. In other configurations, the light emitters 230 can emit light through the top member and/or the bottom member. Each light emitter 230 emits at least one color. The color or colors being emitted by the light emitters 230 are generated in response to one or more signals corresponding to at least one predefined condition (generally referred to herein as a "control signal").

Below is a table that indicates a set of predefined conditions for an unmanned pallet jack:

TABLE 1

| Sample Light Assignments | | | | | | | |
|---|---|---|---|---|---|---|---|
| Red | | Green | | Yellow | | Blue | |
| Solid | Flashing | Solid | Flashing | Solid | Flashing | Solid | Flashing |
| Failure | Low battery | Ok | Startup | Obstruction identified | Moving warning | None | Service required |

Assuming a controller was configured to implement color coded assignments of Table 1 for the indicated predetermined conditions for a robotic vehicle used in a factory or warehouse, specific LEDs, from the plurality of LEDs 230, would be selectively turned on when an indicated predefined condition exists, e.g., is sensed. In the simplest form, coding and signal generation mechanisms used with prior art signal towers can also be used to drive the LEDs 230 of the low-profile signal device 200.

In another embodiment, the housing 210 need not include one or both of the top member 212 and the bottom member 213, whereby the light emitters 230 are substantially surrounded or encircled by the outer member 211, but are not enclosed by the top member 212 and/or bottom member 213.

In the above embodiments, the outer member 211, top member 212, and bottom member 213 substantially surround one or more circuit boards, each circuit board having a top side and a bottom side to which the plurality of light emitters 230 can be attached. In this manner, the outer member 211, top member 212, and bottom member 213 can collectively enclose light emitters 230. Alternatively, the light emitters 230 can be positioned on a peripheral edge of the circuit board 220, wherein the outer member 211 is either omitted, in whole or part, or is positioned between the light emitters 230 and a central region or point of the low-profile signal device, e.g., a center of the circuit board 220.

Figure 3:
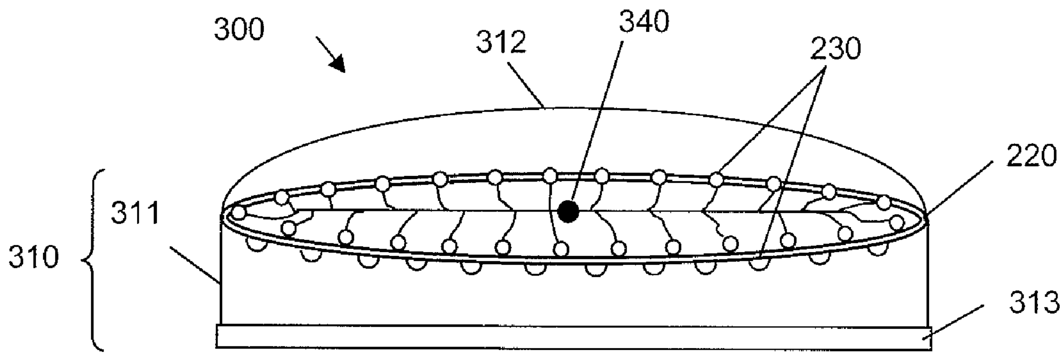
FIG. 3 is an illustrative perspective view of a low-profile signal device comprising a housing, according to aspects of the present invention.

FIG. 3 illustrates another embodiment of a low-profile signal device 300. In this embodiment a housing of a different form is included, i.e., housing 310, along with circuit board 220 and the plurality of light emitters 230, e.g., LEDs, described above. Circuit board 220 and light emitters 230 are substantially the same as those described above with respect to FIGS. 2A and 2B. As with housing 210 above, housing 310 can comprise portions that enable the transmission of some or all of the light from the LEDs 230. Such portions of housing 310 can, therefore, be formed from clear, translucent, semi-transparent, or transparent materials, for example, molded plastics, glass, fiberglass, and the like.

In this embodiment, the housing 310 has a dome-shaped top member 312 and a disc-shaped bottom member 313. Bottom member 313 can be substantially similar to the bottom member 213 of FIGS. 2A-C. Housing 310 can optionally include outer member 311. In embodiments where outer member 311 is not included, top member 312 can directly couple bottom member 313.

As with the embodiments above, circuit board 220 can peripherally attach to housing 310, or can otherwise be maintained within housing 310, such that the housing 310 surrounds the light emitters, and light is emitted by the light emitters through a light-transmittable portion of the housing 310. Alternatively, the light emitters 230 can be positioned on a peripheral edge of the circuit board 220, wherein an opening is formed in housing 310 (or outer member 311, if included) through which light is emitted, or housing 310 (or outer member 311, if included) is positioned between the light emitters 230 and a central region or point of the low-profile signal device 300, e.g., a center of the circuit board 220.

The top member 212 and/or the bottom member 213 of the support member 210 can include a coupling (not shown) that enables the low-profile signal device to be attached to another low-profile signal device or to the surface of a stationary object or a mobile object. In one embodiment, the coupling is a magnetic surface of the top member 212 and/or bottom member 213, which enables the signal device to be coupled to a conductive surface of another signal device or a stationary or mobile object.

In various embodiments, the low-profile signal device can include a coupling configured to mount the device to any of a variety of types of surfaces, equipment of apparatuses. For example, the low-profile signal device can be configured for mounting to a pole, or other base that permits top, bottom or side surface mounting (e.g., to a wall, or side surface of a machine). When attached to a pole or mounting base, the device can be attached to a first end of a pole or mounting base, and the other end of the pole or mounting base can be fixedly attached to the surface of the equipment. In various embodiments, the bottom member (e.g., 213, 313) of the device housing (e.g., 210, 310) can also serve as a mounting base, as described above.

The signal device 200 can further comprise an optional audio indicator 227 (see FIG. 2B) that is configured to generate a sound, in addition to emitting color lights, corresponding to a set of predefined conditions. In such embodiments, the predefined conditions indicated by the sounds are preferably related to the conditions indicated by the emitted colors of the light emitters 230. As an example, a control signal generated by a controller, and received by the signal interface, can apply one or more control signals to both the light emitters 230 and the audio indicator. The audio indicator 227 can take to form of, for example, a bell, siren, tone, horn, whistle or any computer generated sound.

In some embodiments, a signal device can comprise multiple low-profile signal devices that are each stacked on each other along a vertical axis. In such embodiments, each low-profile signal device can receive control signals from a common controller, and receive power from a common power source. Each low-profile signal device in the signal device stack can generate one or more colors, or multiple signal devices can generate the same color, in response to one or more control signals. In accordance with such embodiments, several colors can be accommodated with a stack at a fraction of the height of conventional stack lights.

In various embodiments, the housing, such as housing 210 shown in FIG. 2A-2B and housing 310 shown in FIG. 3, can be composed of water-proof or water resistant materials, and can surround the circuit board 220 and light emitters 230 therein in a manner that insulates the circuit board 220 and light emitters 230 from moisture. In other embodiments, the housing could also be configured to be shock, chemical, biological, and/or radiological resistant or proof.

Figure 4:
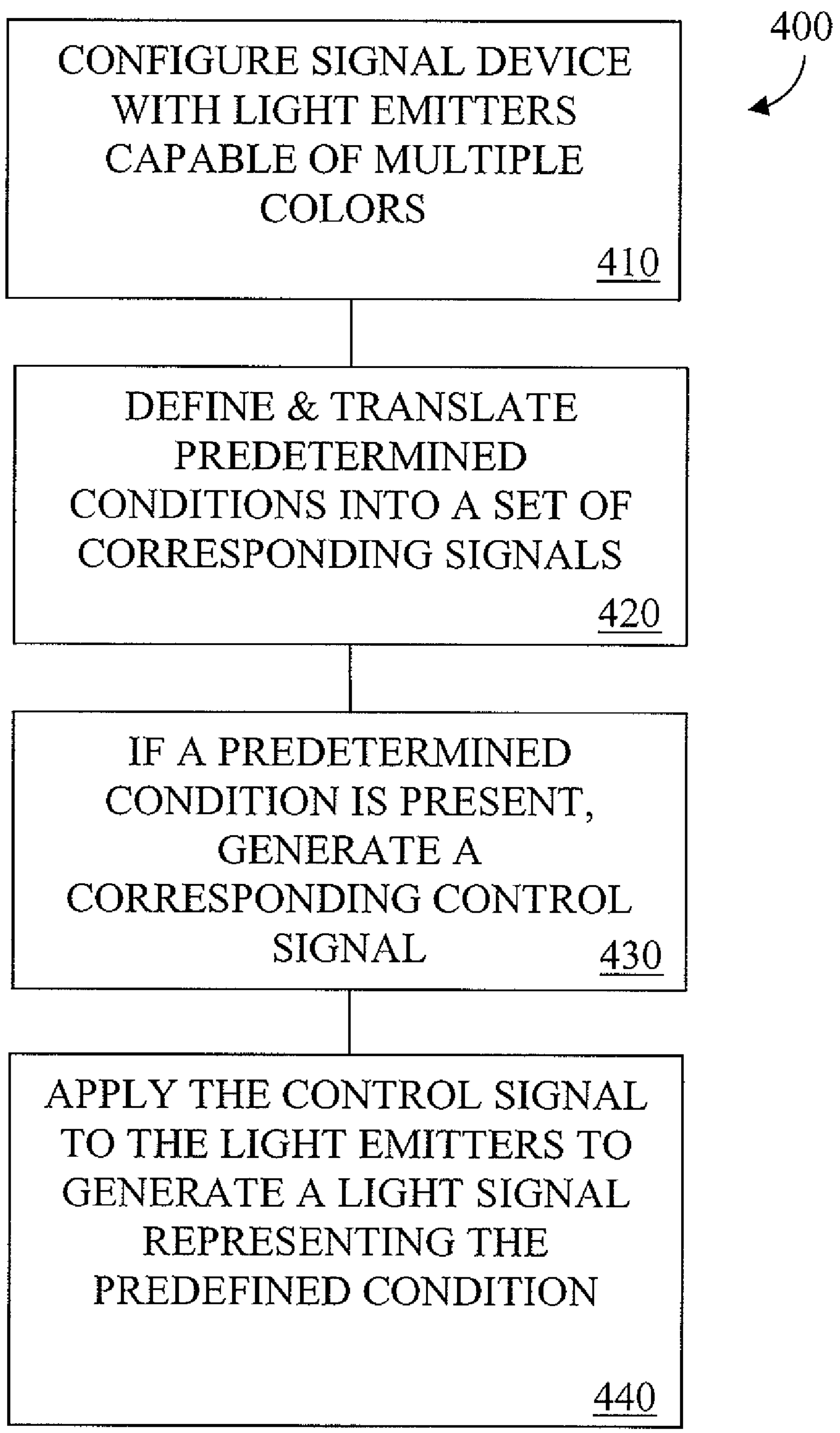
FIG. 4 is a flowchart depicting an embodiment of a method that provides color-coded signals, according to aspects of the present invention.

FIG. 4 provides a flowchart 400 of an embodiment of a set of steps that can be used to provide a status in the form of color-coded signals in a low-profile signal device, e.g., those described herein above. In step 410, a plurality of light emitters is configured in a low-profile signal device that is capable of emitting a plurality of colors. The low-profile signal device can be a single stage device, such as devices 200, 200' and 300 above, which can have its width greater than its height (i.e., w>h). But in other embodiments, multiple stages can be provided and width need not necessarily be greater than height. Each light emitter can produce at least one color selected from a visible spectrum of colors.

Next, as illustrated in step 420, a set of predetermined conditions is defined and translated, or coded, into a set of corresponding control signals. Next, as illustrated in step 430, if one of the predetermined conditions is present (or sensed), one or more corresponding control signals are generated. Next, as illustrated in step 440, the generated control signal or signals are applied to the light emitters to generate a light signal representing the predetermined condition.

While embodiments of the low-profile device have been described with respect to various manufacturing, warehouse, and loading docks, it is not limited to such environments. In fact, the low-profile signal device can be used in any environment or application where a light emitting signal device requiring generation of a plurality of different signals is required. One such application is a traffic light, which emits color-coded signals in the form of a red light, yellow light, and green light, or a combination of red, yellow, and green lights, wherein a red light is associated with a first predefined condition, i.e., stop; a yellow light is associated with a second predefined condition, i.e., caution or slow; and a green light is associated with a third predefined condition, i.e., go. A variety of other applications can be envisioned, e.g., in fire alarm systems.

While the foregoing has described what are considered to be the best mode and/or other preferred embodiments, it is understood that various modifications can be made therein and that the invention or inventions can be implemented in various forms and embodiments, and that they can be applied in numerous applications, only some of which have been described herein. It is intended by the following claims to claim that which is literally described and all equivalents thereto, including all modifications and variations that fall within the scope of each claim.

What is claimed is:

1. A low-profile signal device comprising:

a plurality of light emitters disposed on at least one planar support member, the plurality of light emitters configured to emit light in a plurality of colors and in a plurality of directions to selectively indicate one or more of a plurality of predefined conditions;

a disk-shaped transparent housing substantially enclosing the at least one support member, wherein the at least one support member is horizontally disposed so that a first group of light emitters coupled to a top side of the at least one support member emits light through an upper portion of the housing and a second group of light emitters coupled to a bottom side of the at least one support member emits light through a bottom portion of the housing; and a signal interface coupled to the plurality of light emitters and configured to receive a control signal from a controller in response to at least one stimuli indicating the existence of at least one sensed condition from the plurality of predefined conditions, the signal interface configured to selectively activate the first and second groups of light emitters in response to the received control signal to visually indicate the at least one sensed condition with a respective predefined combination of colors and flashing patterns from among and between the first and second groups of light emitters, wherein there is a different combination of colors and flashing patterns of the plurality of light emitters for each of the plurality of predefined conditions.

2. The device of claim 1, wherein a width of the housing is greater than a height of the housing.

3. The device of claim 2, wherein the height of the housing is not more than about 1 inch.

4. The device of claim 1, wherein the at least one support member includes a circuit board having circuit paths formed therein connecting the plurality of light emitters to the signal interface.

5. The device of claim 1, wherein the first group of emitters is configured to provide a first set of colors and the second group of emitters is configured to provide a second set of color, different from the first set of colors.

6. The device of claim 1, wherein the housing comprises:

an outer member surrounding a periphery of the at least one support member, and further comprises at least one of:

a top member disposed over the top side of the at least one support member and peripherally coupled to a top portion of the outer member; and a bottom member disposed below the bottom side of the at least one support member and peripherally coupled to a bottom portion of the outer member.

7. The device of claim 1, wherein the plurality of light emitters comprises light emitting diodes (LEDs).

8. The device of claim 7, wherein the LEDs include single color light emitting diodes.

9. The device of claim 7, wherein the LEDs include multi-color light emitting diodes.

10. The device of claim 1, further comprising an audio alarm configured to generate a sound from a set of predefined sounds, each sound indicating one of the predefined conditions.

11. The device of claim 1, further comprising a coupling for mounting the device to a piece of mobile equipment.

12. The device of claim 1, wherein the housing forms a waterproof or water resistant enclosure around the support member and the plurality of light emitters.

13. The device of claim 1, wherein the at least one support member is a plurality of support members, with light emitters mounted to each support member in the plurality of support members.

14. The device of claim 1, further comprising:

a second plurality of light emitters disposed on a second support member, the second plurality of light emitters configured to emit light in a second plurality of colors.

15. A low-profile signal device comprising:

a plurality of light emitting diodes (LEDs) disposed on at least one circuit board, the plurality of LEDs configured to emit light in a plurality of colors and in a plurality of directions to selectively indicate one or more of a plurality of predefined conditions;

a transparent housing substantially enclosing the at least one circuit board, including a first group of LEDs coupled to a top side of the at least one circuit board that emits light through an upper portion of the housing and a second group of LEDs coupled to a bottom side of the at least one circuit board that emits light through a bottom portion of the housing;

a signal interface coupled to the plurality of LEDs and configured to receive a control signal from a controller in response to at least one stimuli indicating the existence of at least one sensed condition from the plurality of predefined conditions, the signal interface configured to selectively activate the first and second groups of LEDs in response to the received control signal to visually indicate the at least one sensed condition with a respective predefined combination of colors and flashing patterns from among and between the first and second groups of LEDs, wherein there is a different combination of colors and flashing patterns of the plurality of LEDs for each of the plurality of predefined conditions.

16. The device of claim 15, wherein the LEDs include single color light emitting diodes.

17. The device of claim 15, wherein the LEDs include multi-color light emitting diodes.

18. The device of claim 15, wherein a width of the housing is greater than a height of the housing.

19. The device of claim 15, wherein the height is not more than about 1 inch.

20. The device of claim 15, further comprising a coupling configured to mount the device to a surface.

21. A method of indicating the existence of one or more predefined conditions, the method comprising:

configuring a disk-shaped signal device with a plurality of light emitters disposed on at least one support member to emit light in a plurality of colors, the signal device including:

a disk-shaped transparent housing substantially enclosing the at least one support member, wherein a first group of light emitters coupled to a top side of the support member emits light through an upper portion of the housing and a second group of light emitters coupled to a bottom side of the at least one support member emits light through a bottom portion of the housing;

defining a set of predefined conditions and translating the set of predefined conditions into a corresponding set of control signals;

in response to at least one stimuli indicating the existence of at least one sensed predefined condition from the set of predefined conditions, generating a corresponding control signal from the set of control signals; and selectively activating the first and second groups of light emitters in response to the control signal to visually indicate the at least one sensed condition with a respective predefined combination of colors and flashing patterns from among and between the first and second groups of light emitters, wherein there is a different combination of colors and flashing patterns of the plurality of light emitters for each of the plurality of predefined conditions.

22. The method of claim 21, wherein the light emitters include light emitting diodes (LEDs).

23. The method of claim 22, wherein the LEDs include single color LEDs.

24. The method of claim 22, wherein the LEDs include multi-color LEDs.

25. The method of claim 21, wherein a width of the housing is greater than a height of the housing.

26. The method of claim 24, wherein the height of the housing is not more than about 1 inch.

27. A method of making a low-profile signal device, comprising:

coupling a plurality of light emitters to at least one support member, the plurality of light emitters configured to emit light in a plurality of colors and in a plurality of directions to indicate one or more of a plurality of predefined conditions;

substantially enclosing the at least one support member with a disk-shaped transparent housing, wherein a first group of light emitters coupled to a top side of the support member emits light through an upper portion of the housing and a second group of light emitters coupled to a bottom side of the at least one support member emits light through a bottom portion of the housing;

coupling a signal interface to the plurality of light emitters, the signal interface configured to receive a control signal from a controller in response to at least one stimuli indicating the existence of at least one sensed condition from the plurality of predefined conditions, the signal interface selectively activating the first and second groups of light emitters in response to the received control signal to visually indicate the at least one sensed condition with a respective predefined combination of colors and flashing patterns from among and between the first and second groups of light emitters, wherein there is a different combination of colors and flashing patterns of the plurality of light emitters for each of the plurality of predefined conditions.

28. The method of claim 27, wherein the light emitters include light emitting diodes (LEDs).

29. The method of claim 28, wherein the LEDs include single color LEDs.

30. The method of claim 28, wherein the LEDs include multi-color LEDs.

31. The method of claim 27, wherein a width of the housing is greater than a height of the housing.

32. The method of claim 31, wherein the height of the housing is not more than about 1 inch.

* * * * *